(12) United States Patent
Sakurai et al.

(10) Patent No.: US 8,466,229 B2
(45) Date of Patent: Jun. 18, 2013

(54) COMPOSITION FOR FORMING SILICA-BASED FILM, METHOD OF FORMING SILICA-BASED FILM, AND ELECTRONIC COMPONENT PROVIDED WITH SILICA-BASED FILM

(75) Inventors: Haruaki Sakurai, Hitachi (JP); Koichi Abe, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 510 days.

(21) Appl. No.: 12/292,655

(22) Filed: Nov. 24, 2008

(65) Prior Publication Data

US 2009/0110838 A1 Apr. 30, 2009

Related U.S. Application Data

(63) Continuation of application No. 10/932,319, filed on Sep. 2, 2004.

(51) Int. Cl.
  *C08L 83/04* (2006.01)
(52) U.S. Cl.
  USPC ........................... 524/588; 528/481
(58) Field of Classification Search
  USPC ........................... 528/481; 524/588
  See application file for complete search history.

(56) References Cited

U.S. PATENT DOCUMENTS

| 4,544,453 A * | 10/1985 | Gupta ........................... 203/44 |
| 7,358,300 B2 | 4/2008 | Sakurai et al. |
| 7,682,701 B2 * | 3/2010 | Sakurai et al. ................. 428/447 |
| 2005/0119394 A1 | 6/2005 | Sakurai et al. |

FOREIGN PATENT DOCUMENTS

| JP | 3-45510 A | 2/1991 |
| JP | 3-188179 A | 8/1991 |
| JP | 4-180977 A | 6/1992 |
| JP | 9-50994 A | 2/1997 |
| JP | 11-310411 A | 11/1999 |
| JP | 11-322992 A | 11/1999 |
| JP | 2001-55554 A | 2/2001 |
| JP | 2001-83710 A | 3/2001 |
| JP | 2001-98218 A | 4/2001 |
| JP | 2001-172565 A | 6/2001 |
| JP | 2001-187821 A | 7/2001 |
| JP | 2001-254052 A | 9/2001 |
| JP | 2001-262062 A | 9/2001 |
| JP | 2002-60691 A | 2/2002 |
| JP | 2002-129103 A | 5/2002 |
| JP | 2002-201415 A | 7/2002 |
| JP | 2002-201416 A | 7/2002 |
| JP | 2002-285086 A | 10/2002 |
| JP | 2003-41191 A | 2/2003 |
| JP | 2003-64306 A | 3/2003 |
| JP | 2003-64307 A | 3/2003 |
| JP | 2003-171616 A | 6/2003 |
| JP | 2003-183575 A | 7/2003 |
| JP | 2003-253204 A | 9/2003 |
| JP | 2003-257963 A | 9/2003 |
| JP | 2004-277501 A | 10/2004 |
| JP | 2004-277502 A | 10/2004 |
| JP | 2004-277508 A | 10/2004 |
| JP | 2005048190 A | 2/2005 |
| JP | 2005146282 A | 6/2005 |
| JP | 3674041 B2 | 7/2005 |

OTHER PUBLICATIONS

EX parte Wu (2010 WL 3615678).*
Japanese Office Action dated Apr. 7, 2009 issued in corresponding patent Application No. 2004-312793.
Japanese Office Action dated Jul. 28, 2009 issued in related Japanese patent Application No. 2004260261.
Japanese Office Action dated Jul. 28, 2009 issued in related Japanese patent Application No. 2004329593.
Sumio Sakka, "The Science of Sol-Gel Method" by published on Jul. 5, 1988 (Partial Translation) (5 pages).

\* cited by examiner

*Primary Examiner* — Kuo-Liang Peng
(74) *Attorney, Agent, or Firm* — Westerman, Hattori, Daniels & Adrian, LLP (57) ABSTRACT

The present invention provides a composition for forming a silica-based film, the composition containing (a) a siloxane resin; (b) an organic solvent including at least one species of aprotic solvent; and (c) an onium salt.

11 Claims, 5 Drawing Sheets

COMPOSITION FOR FORMING SILICA-BASED FILM, METHOD OF FORMING SILICA-BASED FILM, AND ELECTRONIC COMPONENT PROVIDED WITH SILICA-BASED FILM

CROSS-REFERENCE TO RELATED APPLICATIONS

This application is a continuation of U.S. application Ser. No. 10/932,319, filed on Sep. 2, 2004, which is herein incorporated by reference.

BACKGROUND OF THE INVENTION

1. Field of the Invention

The present invention relates to a composition for forming a silica-based film, a silica-based film, a method of making the same, and an electronic component provided with the silica-based film.

2. Related Background Art $SiO_2$ films, formed by CVD, having a relative permittivity of about 4.2, have conventionally been used as a material for forming an interlayer insulating film. However, from the viewpoint of reducing the capacity between wires in the device so as to improve the operating speed of LSI, materials which can exhibit a lower dielectric constant have been in demand.

For this demand, SiOF films, formed by CVD, having a relative permittivity of about 3.5, have been developed. Further, organic SOG (Spin On Glass), organic polymers, etc. have been developed as insulating materials having a relative permittivity of 2.5 to 3.0. Also, as an insulating material having a relative permittivity of 2.5 or less, porous materials having a pore in a film have been considered effective, and they have vigorously been under study and development so as to be employed in interlayer insulating films for LSI.

As a method of forming such a porous material, one using organic SOG has been proposed in Japanese Patent Application Laid-Open Nos. HEI 11-322992 and HEI 11-310411. This method heats a composition containing a hydrolytic condensate and a polymer having a volatile or decomposing property, so as to form a film, and then heats the film, so as to form a pore in the film, thereby yielding a porous material.

SUMMARY OF THE INVENTION

In electronic device parts such as semiconductor devices typified by LSI, increases in signal delay time due to increases in the capacity between wires have been becoming problematic as wires have become thinner because of higher integration. Therefore, insulating materials for electronic device parts have been required to attain not only heat resistance, mechanical characteristics, etc., but also a lower relative permittivity and a shorter heating step.

In general, the signal propagation velocity (v) of a wire and the relative permittivity ($\in$) of an insulating material in contact with a wiring material have a relationship represented by the expression of v=k/√$\in$, where k is a constant. Namely, the signal propagation can be made faster if the frequency region in use is made higher while the relative permittivity ($\in$) of the insulating material is lowered.

The inventors studied the above-mentioned conventional method in detail, and have found it necessary to introduce a quite large amount of pore (void) into an insulating film in order to achieve a low dielectric constant required for the insulating film. Also, the inventors have found that a layer tends to further lower its mechanical strength if the porosity increases in excess when the mechanical film strength or film hardness of the organic SOG to become a base material of the film is inherently insufficient. However, the film strength tends to decrease as the relative permittivity decreases, whereby there remains a large problem for conventional processes to be applied thereto.

For hardening the coating film forming composition so as to form a film, a high-temperature atmosphere at 450° C. or higher is necessary. Also, a long period of about 1 hour is likely to be required until the hardening finally ends. Therefore, when such a film is used as an interlayer insulating film, there is a fear of the heat input amount (thermal budget) in the film forming process deteriorating other layers, a wiring layer in particular. Also, substrates may warp remarkably as the heat input amount increases.

Further, as mentioned above, higher integration has been accelerating the thinning of wires, whereby individual member layers constituting semiconductor devices have been reducing their thickness and increasing their number, while wiring layers and the like have been changing their materials. The influence of the heat input amount on the deterioration in materials of the layers is expected to increase from now on, whereby there is an urgent need to improve thermal histories by lowering thermal load in each process.

It is an object of the present invention to provide a composition for forming a silica-based film, which has an excellently low dielectric property and a sufficient mechanical strength while being curable at a lower temperature in a shorter time as compared with conventional ones; a silica-based film comprising such a composition, a method of forming the same, and an electronic component provided with such a silica-based film.

For achieving the above-mentioned object, the inventors conducted diligent studies from the viewpoint of material components and their compositions for yielding a silica-based film suitable for an insulating film and, as a result, have found that a composition containing a specific component can eliminate various conventional problems, thereby completing the present invention.

The present invention provides a composition for forming a silica-based film, the composition comprising (a) a siloxane resin; (b) an organic solvent containing at least one species of aprotic solvent; and (c) an onium salt.

Preferably, the siloxane resin in the present invention contains a siloxane resin obtainable by hydrolyzing and condensing a compound represented by the following general formula (1):

$$R^1{}_n SiX_{4-n} \qquad (1)$$

In expression (1), $R^1$ is an H or F atom, a group containing a B, N, Al, P, Si, Ge, or Ti atom, or an organic group having a carbon number of 1 to 20; X is a hydrolyzable group; and n is an integer of 0 to 2. When n is 2, $R^1$ may be either identical or different. When n is 0 to 2, X may be either identical or different.

The composition for forming a silica-based film in accordance with the present invention contains a siloxane resin as a film forming component, an aprotic solvent as an essential component of an organic solvent component for dissolving the siloxane resin, and an onium salt, and thus can form a silica-based film having an excellently low dielectric property, in a high-frequency region (of at least 100 kHz, e.g., 1 MHz) in particular, and a sufficient mechanical strength, while being curable at a lower temperature in a shorter time as compared with conventional ones. Since the composition can be cured at a lower temperature in a shorter time, the heat input amount in the film forming process is reduced. Therefore, problems such as deterioration in wiring layers and the like and warping of substrates can be eliminated. Further, the uniformity in thickness of the film can be improved. Such effects can be exhibited further effectively and reliably if one obtainable by hydrolyzing and condensing the compound represented by the above-mentioned general formula (1) is employed as the siloxane resin.

Though causes of the above-mentioned effects are not completely clear, it is presumed that the silica-based film attains a low dielectric property and a sufficient mechanical strength mainly because the siloxane resin and aprotic solvent are used together, whereas the film is curable at a lower temperature in a shorter time mainly because the aprotic solvent and onium salt are used together. On the other hand, the uniformity in thickness of the film seems to improve mainly because the aprotic solvent is used.

The aprotic solvent preferably contains at least one species of aprotic solvent selected from the group consisting of alkylene glycol dialkyls, alkylene glycol alkyl esters, alkylene glycol diesters, and cyclic ketones; whereas at least one species of the aprotic solvent is preferably an aprotic solvent having a relative permittivity of at least 10. Preferably, the content of the aprotic solvent having a relative permittivity of at least 10 is at least 50 mass % based on the weight of the organic solvent containing at least one aprotic solvent.

In particular, the composition for forming a silica-based film comprising a aprotic solvent having a relative permittivity of at least 10 as an organic solvent component tends to narrow its pore distribution when pores are formed while a pore forming compound, which will be explained later, is contained therein.

Preferably, the total content of H, F, B, N, Al, P, Ge, Ti, and C atoms in the siloxane resin with respect to 1 mol of Si atom is 0.65 mol or less.

The composition for forming a silica-based film having the configuration mentioned above restrains the adhesion and mechanical strength between the silica-based film and other films (layers) from decreasing. This can also prevent interfacial peeling from occurring in the process of CMP (chemical mechanical polishing) metal wiring layers made of Cu or the like coated on the silica-based film.

Preferably, the onium salt is an ammonium salt. Thus configured composition for forming a silica-based film can enhance the stability of the composition and further improve electric and mechanical characteristics of the silica-based film.

Preferably, the composition further contains a pore forming compound which thermally decomposes or evaporates at a heating temperature of is 250° to 500° C. Thus configured composition for forming a silica-based film can form a silica-based film capable of achieving a lower dielectric constant while restraining mechanical strength from remarkably decreasing.

In another aspect, the present invention provides a method of forming a silica-based film on a substrate, the method comprising the steps of forming a coating film by applying the composition for forming a silica-based film in accordance with the present invention onto the substrate; removing the organic solvent contained in the coating film; and firing the coating film at a heating temperature of 250° to 500° C. after the removing step.

In still another aspect, the present invention provides a silica-based film disposed on a substrate and formed by the above-mentioned method of forming a silica-based film. Such a film is useful, in particular, as one formed between conductive layers arranged adjacent each other among a plurality of conductive layers disposed on the substrate, i.e., an insulating film required to sufficiently lower a leak current, e.g., an interlayer insulating film.

In still another aspect, the present invention provides an electronic component comprising a substrate and the silica-based film in accordance with the present invention formed thereon. Such an electronic component constitutes an electronic device such as a semiconductor device.

DESCRIPTION OF THE PREFERRED EMBODIMENTS

In the following, preferred embodiments of the present invention will be explained in detail with reference to the drawings when necessary. Among the drawings, constituents identical to each other will be referred to with numerals identical to each other without repeating their overlapping descriptions. Positional relationships such as upper, lower, left, and right positions will be based on those depicted unless otherwise specified. Ratios of dimensions in the drawings are not limited to those depicted. In the specification, "(meth) acrylate" refers to "acrylate" and its corresponding "methacrylate".

While the composition for forming a silica-based film in accordance with the present invention contains (a) to (c) components, the characteristic feature of the present invention lies in that the composition contains at least one species of aprotic solvent, i.e., a polar solvent having a high relative permittivity, as the (b) component. In the following, the individual components of the composition for forming a silica-based film in accordance with the present invention will be explained in detail.

(a) Component

The siloxane resin used as the (a) component in the present invention functions as a film forming component of a silica-based film, which will be explained later. For exhibiting such a function, it will be preferred if the composition for forming a silica-based film in accordance with the present invention contains a siloxane resin obtainable by hydrolyzing and condensing a compound represented by the following general formula (1):

$$R^1_n SiX_{4-n} \tag{1}$$

In the above-mentioned expression (1), $R^1$ is an H or F atom; a group containing a B, N, Al, P, Si, Ge, or Ti atom; or an organic group having a carbon number of 1 to 20 (preferably 1 to 12, more preferably 1 to 6).

The value of M, where M is defined as set forth in formula (2) below, is preferably not greater than 0.65, more preferably not greater than 0.55, not greater than 0.50 in particular, quite preferably not greater than 0.45. The lower limit for M is preferably about 0.20. As defined in formula (2), M relates to the total amount of H, F, B, N, Al, P, Si, Ge, Ti, and C atoms (hereinafter referred to as "specific binding atoms") bonded to a Si atom forming a siloxane bond (O—Si) of the siloxane resin. M relates to the number of specific binding atoms bonded to a Si from the $R^1$ substituents.

When the M value exceeds 0.65, the adhesion, mechanical strength, etc. between the finally obtained silica-based film and other films (layers) tend to deteriorate. When the M value is less than 0.20, on the other hand, the film tends to deteriorate its dielectric property when used as an insulating film. From the viewpoint of improving the film forming property in the silica-based film, it will be more preferred if the siloxane resin contains at least one species of H, F, N, Si, Ti, and C atoms among the specific binding atoms mentioned above. Among them, from the viewpoint of improving dielectric characteristics and mechanical strength, it will be more preferred if at least one species of H, F, N, Si, and C atoms is contained in the siloxane resin.

The M value can be determined from the feeding amount of the compound represented by the above-mentioned general formula (1), which is a material for the siloxane resin. For example, it can be calculated from the following formula (2):

$$M=[M_1+(M_2/2)+(M_3/3)]/M_{Si} \qquad (2)$$

wherein $M_1$ is the total number of specific binding atoms which are respectively bonded with a single (sole) Si atom; $M_2$ is the total number of specific binding atoms which are respectively bonded to two silicon atoms; $M_3$ is the total number of specific binding atoms which are respectively bonded to three silicon atoms; and $M_{Si}$ is the total number of Si atoms.

In the above-mentioned general formula (1), X is a hydrolyzable group. Examples of X include alkoxy groups, aryloxy groups, halogen atoms, acetoxy group, isocyanate group, and hydroxyl group, among which alkoxy groups are preferred. When X is an alkoxy group, the liquid stability, coating characteristics, etc. of the composition become better.

Examples of the compound represented by the above-mentioned general formula (1) in the case where the hydrolyzable group X is an alkoxy group include tetraalkoxysilane, trialkoxysilane, and dialkoxysilane, each of which may be substituted.

Examples of tetraalkoxysilane include tetramethoxysilane, tetraethoxysilane, tetra-n-propoxysilane, tetra-iso-propoxysilane, tetra-n-butoxysilane, tetra-sec-butoxysilane, and tetra-tert-butoxysilane.

Examples of trialkoxysilane include trimethoxysilane, triethoxysilane, tripropoxysilane, fluorotrimethoxysilane, fluorotriethoxysilane, methyltrimethoxysilane, methyltriethoxysilane, methyltri-n-propoxysilane, methyltri-iso-propoxysilane, methyltri-n-butoxysilane, methyltri-iso-butoxysilane, methyltri-tert-butoxysilane, ethyltrimethoxysilane, ethyltriethoxysilane, ethyltri-n-propoxysilane, ethyltri-iso-propoxysilane, ethyltri-n-butoxysilane, ethyltri-iso-butoxysilane, ethyltri-tert-butoxysilane, n-propyltrimethoxysilane, n-propyltriethoxysilane, n-propyltri-n-propoxysilane, n-propyltri-iso-propoxysilane, n-propyltri-n-butoxysilane, n-propyltri-iso-butoxysilane, n-propyltri-tert-butoxysilane, iso-propyltrimethoxysilane, iso-propyltriethoxysilane, iso-propyltri-n-propoxysilane, iso-propyltri-iso-propoxysilane, iso-propyltri-n-butoxysilane, iso-propyltri-iso-butoxysilane, iso-propyltri-tert-butoxysilane, n-butyltrimethoxysilane, n-butyltriethoxysilane, n-butyltri-n-propoxysilane, n-butyltri-iso-propoxysilane, n-butyltri-n-butoxysilane, n-butyltri-iso-butoxysilane, n-butyltri-tert-butoxysilane, n-butyltriphenoxysilane, sec-butyltrimethoxysilane, sec-butyltriethoxysilane, sec-butyltri-n-propoxysilane, sec-butyltri-iso-propoxysilane, sec-butyltri-n-butoxysilane, sec-butyltri-iso-butoxysilane, sec-butyltri-tert-butoxysilane, t-butyltrimethoxysilane, butyltriethoxysilane, t-butyltri-n-propoxysilane, t-butyltri-iso-propoxysilane, t-butyltri-n-butoxysilane, t-butyltri-iso-butoxysilane, t-butyltri-tert-butoxysilane, phenyltrimethoxysilane, phenyltriethoxysilane, phenyltri-n-propoxysilane, phenyltri-iso-propoxysilane, phenyltri-n-butoxysilane, phenyltri-iso-butoxysilane, phenyltri-tert-butoxysilane, trifluoromethyltrimethoxysilane, pentafluoroethyltrimethoxysilane, 3,3,3-trifluoropropyltrimethoxysilane, and 3,3,3-trifluoropropyltriethoxysilane.

Examples of dialkoxysilane include dimethyldimethoxysilane, dimethyldiethoxysilane, dimethyldi-n-propoxysilane, dimethyldi-iso-propoxysilane, dimethyldi-n-butoxysilane, dimethyldi-sec-butoxysilane, methyldi-tert-butoxysilane, diethyldimethoxysilane, diethyldiethoxysilane, diethyldi-n-propoxysilane, diethyldi-iso-propoxysilane, diethyldi-n-butoxysilane, diethyldi-sec-butoxysilane, diethyldi-tert-butoxysilane, di-n-propyldimethoxysilane, di-n-propyldiethoxysilane, di-n-propyldi-n-propoxysilane, di-n-propyldi-iso-propoxysilane, di-n-propyldi-n-butoxysilane, di-n-propyldi-sec-butoxysilane, di-n-propyldi-tert-butoxysilane, di-iso-propyldimethoxysilane, di-iso-propyldiethoxysilane, di-iso-propyldi-n-propoxysilane, di-iso-propyldi-iso-propoxysilane, di-iso-propyldi-n-butoxysilane, di-iso-propyldi-sec-butoxysilane, di-iso-propyldi-tert-butoxysilane, di-n-butyldimethoxysilane, di-n-butyldiethoxysilane, di-n-butyldi-n-propoxysilane, di-n-butyldi-iso-propoxysilane, di-n-butyldi-n-butoxysilane, di-n-butyldi-sec-butoxysilane, di-n-butyldi-tert-butoxysilane, di-sec-butyldimethoxysilane, di-sec-butyldiethoxysilane, di-sec-butyldi-n-propoxysilane, di-sec-butyldi-iso-propoxysilane, di-sec-butyldi-n-butoxysilane, di-sec-butyldi-sec-butoxysilane, di-sec-butyldi-tert-butoxysilane, di-tert-butyldimethoxysilane, di-tert-butyldiethoxysilane, di-tert-butyldi-n-propoxysilane, di-tert-butyldi-iso-propoxysilane, di-tert-butyldi-n-butoxysilane, di-tert-butyldi-sec-butoxysilane, di-tert-butyldi-tert-butoxysilane, diphenyldimethoxysilane, diphenyldiethoxysilane, diphenyldi-n-propoxysilane, diphenyldi-iso-propoxysilane, diphenyldi-n-butoxysilane, diphenyldi-sec-butoxysilane, diphenyldi-tert-butoxysilane, bis(3,3,3-trifluoropropyl)dimethoxysilane, and methyl(3,3,3-trifluoropropyl)dimethoxysilane.

Examples of the compound represented by the above-mentioned general formula (1) in the case where the hydrolyzable group X is an aryloxy group include tetraaryloxysilane, triaryloxysilane, and diaryloxysilane, each of which may be substituted. An example of tetraaryloxysilane is tetraphenoxysilane. Examples of triaryloxysilane include triphenoxysilane, methyltriphenoxysilane, ethyltriphenoxysilane, n-propyltriphenoxysilane, iso-propyltriphenoxysilane, sec-butyltriphenoxysilane, t-butyltriphenoxysilane, and phenyltriphenoxysilane. Examples of diaryloxysilane include dimethyldiphenoxysilane, diethyldiphenoxysilane, di-n-propyldiphenoxysilane, di-iso-propyldiphenoxysilane, di-n-butyldiphenoxysilane, di-sec-butyldiphenoxysilane, di-tert-butyldiphenoxysilane, and diphenyldiphenoxysilane.

Examples of the compound expressed by the general formula (1) in the case where X is a halogen atom (halogen group), i.e. halogenated silane, include compounds in which alkoxy groups in the alkoxysilane molecules mentioned above are substituted by halogen atoms. Examples of the compound (acetoxysilane) expressed by the general formula (1) in the case where X is an acetoxy group include compounds in which alkoxy groups in the alkoxysilane molecules mentioned above are substituted by acetoxy groups. Examples of the compound (isocyanate silane) expressed by the general formula (1) in the case where X is an isocyanate group include compounds in which alkoxy groups in the alkoxysilane molecules mentioned above are substituted by isocyanate groups. Examples of the compound (hydroxysilane) expressed by the general formula (1) in the case where X is a hydroxy group include compounds in which alkoxy groups in the alkoxysilane molecules mentioned above are substituted by hydroxyl groups.

The compounds represented by the above-mentioned formula (1) may be used either singly or in combination of two or more.

Among these compounds, more preferred from the viewpoints of liquid stability, film coating characteristics, etc. of the composition itself is tetraalkoxysilane or organotrialkoxysilane, tetraethoxysilane or methyltriethoxysilane in particular.

In the above-mentioned general formula (1), n is an integer of 0 to 2. When n is 2, $R^1$ may be either identical or different. When n is 0 to 2, X may be either identical or different. Preferably, n is 0 or 1. It will be preferred if a compound represented by the above-mentioned formula (1) in which n=0 and a compound represented by the above-mentioned formula (1) in which n=1 are used in combination. When the respective compounds whose n is 0 and 1 are combined together, the siloxane resin includes a unit represented by $SiO_2$ and a unit represented by $R^1SiO_{3/2}$. Here, $R^1$ is defined as above. This siloxane resin is obtainable by hydrolyzing and co-condensing polyfunctional tetraalkoxysilane and trialkoxysilane mentioned above. The unit represented by $SiO_2$ is one derived from tetraalkoxysilane, whereas the unit represented by $R^1SiO_{3/2}$ is one derived from trialkoxysilane. Since the siloxane resin includes such units, its crosslinking density improves, whereby its coating characteristics can be improved.

Examples of catalysts employed for accelerating the hydrolytic condensation of the compound represented by the above-mentioned general formula (1) include organic acids such as formic acid, maleic acid, fumaric acid, acetic acid, propionic acid, butanoic acid, pentanoic acid, hexanoic acid, heptanoic acid, octanoic acid, nonanoic acid, decanoic acid, oxalic acid, adipic acid, sebacic acid, butyric acid, oleic acid, stearic acid, linolic acid, linoleic acid, salicylic acid, benzoic acid, p-aminobenzoic acid, p-toluenesulfonic acid, phthalic acid, sulfonic acid, tartaric acid, and trifluoromethanesulfonic acid; inorganic acids such as hydrochloric acid, phosphoric acid, nitric acid, boric acid, sulfuric acid, and hydrofluoric acid.

The amount of use of catalysts is preferably within the range of 0.0001 to 1 mol with respect to 1 mole of the compound. When the amount of use exceeds 1 mol, gelling tends to accelerate at the time of hydrolytic condensation. When the amount of use is less than 0.0001 mol, the reaction is less likely to proceed substantially.

The alcohol generated as a byproduct upon the hydrolysis of the compound represented by the above-mentioned general formula (1) in the hydrolytic condensation reaction is a protonic solvent, and is preferably eliminated by use of an evaporator or the like. The amount of water used in the hydrolytic condensation reaction can be determined as appropriate, and is preferably a value within the range of 0.5 to 20 mol with respect to 1 mol of the compound represented by the above-mentioned general formula (1). When the amount of water is less than 0.5 mol or more than 20 mol, the film forming property of the silica-based film tends to deteriorate, and the composition itself is likely to lower its shelf stability.

From the viewpoints of solubility in solvents, mechanical characteristics, formability, etc., the weight average molecular weight (Mw) of the siloxane resin is preferably 500 to 20,000, more preferably 1,000 to 10,000. When Mw is less than 500, the film forming property of the silica-based film tends to deteriorate. When Mw exceeds 20,000, on the other hand, the compatibility with solvents tends to decrease. In the present invention, Mw refers to the weight average molecular weight by gel permeation chromatography (GPC) based on standard polystyrene.

As the siloxane resin, a single species or a combination of two or more species may be used. When combining two or more species, respective siloxane resins having different weight average molecular weights, and respective siloxane resins in which compounds (monomer components) to be hydrolyzed and condensed are different, etc. may be combined, for example.

(b) Component

Preferably, the (b) component is an organic solvent which can dissolve the siloxane resin, which is the (a) component, so as to lower the viscosity thereof, thereby facilitating the handling and the like thereof. The (b) component also functions to narrow the distribution of pores included in the silica-based film by causing the aprotic solvent to have a predetermined relative permittivity or higher.

For exhibiting such a function, the composition for forming a silica-based film in accordance with the present invention contains preferably at least 80 mass %, more preferably at least 90 mass %, further preferably at least 95 mass % of the aprotic solvent based on the weight of the (b) component. If the content of the aprotic solvent in the (b) component is small, it may hinder temperature from lowering and process time from shortening when curing the composition. There is also a fear of increasing the relative permittivity of the film and lowering its mechanical strength.

Preferably, at least one species of aprotic solvent has a relative permittivity of at least 10. Such a relative permittivity tends to narrow the pore distribution in the film when forming pores in the film containing a pore forming compound which will be explained later. The relative permittivity in the present invention refers to the value measured at 20° C. The content of the aprotic solvent having a relative permittivity of at least 10 in the (b) component is preferably at least 50 mass %, more preferably at least 60 mass %.

Examples of the aprotic solvent include ketone-based solvents, ether-based solvents, ester-based solvents, ether-acetate-based solvents, acetonitrile, amide-based solvents, and sulfoxide-based solvents. Among them, ether-based solvents and ketone-based solvents are preferable, alkylene glycol dialkyls, alkylene glycol alkyl esters, alkylene glycol diesters, and cyclic ketones are more preferred, and diethylene glycol dimethylether and cyclohexanone are preferred in particular. Among these preferred aprotic solvents, from the viewpoints of compatibility with the siloxane resin, mechanical strength of the silica-based film, etc., ketone-based solvents are preferred, among which cyclic ketones are more preferred, and cyclohexanone is preferred in particular.

Examples of the ketone-based solvents include acetone, methylethylketone, methyl-n-propylketone methyl-iso-propylketone, methyl-n-butylketone, methyl-iso-butylketone, methyl-n-pentylketone, methyl-n-hexylketone, diethylketone, dipropylketone, di-iso-butylketone, trimethylnanone, cyclohexanone, cyclopentanone, methylcyclohexanone, 2,4-pentanedione, and acetonylacetone.

Examples of ether-based solvents include dioxane, dimethyldioxane, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol methyl ethyl ether, diethylene glycol methyl mono-n-butyl ether, diethylene glycol di-n-butyl ether, diethylene glycol methyl mono-n-hexyl ether, tetraethylene glycol di-n-butyl ether, dipropylene glycol dimethyl ether, dipropylene glycol methyl ethyl ether, dipropylene glycol diethyl ether, tetrahydrofuran, and 2-methyltetrahydrofuran.

Examples of the ester-based solvent include methyl acetate, ethyl acetate, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, nonyl acetate, γ-butyrolactone, γ-valerolactone, methyl acetoacetate, ethyl acetoacetate, diethylene acetate glycol monomethyl ether, diethylene acetate glycol monoethyl ether, diethylene acetate glycol mono-n-butyl ether, dipropylene acetate glycol monomethyl ether, dipropylene acetate glycol monoethyl ether, glycol diacetate, methoxytriglycol acetate, ethyl propionate, n-butyl propionate, i-amyl propionate, diethyl oxalate, and di-n-butyl oxalate.

Examples of the ether-acetate-based solvent include ethylene glycol methyl ether propionate, ethylene glycol ethyl ether propionate, acetate ethylene glycol methyl ether acetate, ethylene glycol ethyl ether acetate, diethylene glycol methyl ether acetate, diethylene glycol ethyl ether acetate, diethylene glycol-n-butyl ether acetate, propylene glycol ethyl ether acetate, propylene glycol propyl ether acetate, dipropylene glycol methyl ether acetate, and dipropylene glycol ethyl ether acetate.

Examples of the amide-based solvent include N,N-dimethylformamide and N,N-dimethylacetoamide, whereas an example of the sulfoxide-based solvent is N,N-dimethylsulfoxide.

Examples of the aprotic solvent having a relative permittivity of at least 10 include ketone-based solvents, acetonitrile, amide-based solvents, and sulfoxide-based solvents. Examples of the ketone-based solvents having a relative permittivity of at least 10 include acetone, methylethylketone, methyl-n-propylketone, methyl-iso-propylketone, methyl-n-butylketone, methyl-iso-butylketone, methyl-n-pentylketone, methyl-n-hexylketone, diethylketone, dipropylketone, di-iso-butylketone, trimethylnonanone, cyclohexanone, cyclopentanone, methylcyclohexanone, 2,4-pentanedione, and acetonylacetone. Examples of the amide-based solvents having a relative permittivity of at least 10 include N,N-dimethylformamide and N,N-dimethylacetoamide. An example of the sulfoxide-based solvents having a relative permittivity of at least 10 is N,N-dimethylsulfoxide.

They may be used either singly or in combination of two or more.

Other protonic solvent components may further be contained as the (b) component when necessary. Examples of such a protonic solvent include alcohol-based solvents, ether-based solvents, and ester-based solvents.

Examples of the alcohol-based solvents include methanol, ethanol, n-propanol, i-propanol, n-butanol, i-butanol, sec-butanol, t-butanol, n-pentanol, i-pentanol, 2-methylbutanol, sec-pentanol, t-pentanol, 3-methoxybutanol, n-hexanol, 2-methylpentanol, sec-hexanol, 2-ethylbutanol, sec-heptanol, n-octanol, 2-ethylhexanol, sec-octanol, n-nonyl alcohol, n-decanol, sec-undecyl alcohol, trimethylnonyl alcohol, sec-tetradecyl alcohol, sec-heptadecyl alcohol, phenol, cyclohexanol, methylcyclohexanol, benzyl alcohol, ethylene glycol, 1,2-propylene glycol, 1,3-butylene glycol, diethylene glycol, dipropylene glycol, triethylene glycol, and tripropylene glycol.

Examples of the ether-based solvents include ethylene glycol methyl ether, ethylene glycol ethyl ether, ethylene glycol monophenyl ether, diethylene glycol monomethyl ether, diethylene glycol monoethyl ether, diethylene glycol mono-n-butyl ether, diethylene glycol mono-n-hexyl ether, ethoxytriglycol, tetraethylene glycol mono-n-butyl ether, dipropylene glycol monomethyl ether, dipropylene glycol monoethyl ether, and tripropylene glycol monomethyl ether.

Examples of the ester-based solvents include methyl lactate, ethyl lactate, n-butyl lactate, and n-amyl lactate.

They may be used either singly or in combination of two or more together with the aprotic solvent.

(c) Component

The (c) component is presumed to function to enhance the stability of the composition for forming a silica-based film and further improve electric and mechanical characteristics of the silica-based film. Also, this component seems to have a function of accelerating the condensation reaction of the (a) component so that the curing can be effected at a lower temperature in a shorter time, and further restrain the mechanical strength from lowering.

For exhibiting such functions, the composition for forming a silica-based film in accordance with the present invention contains an onium salt as the (c) component. Examples of the onium salt include ammonium salts, phosphonium salts, arsonium salts, stibonium salts, oxonium salts, sulfonium salts, selenonium salts, stannonium salts, and iodonium salts. Among them, ammonium salts are preferred because they are superior in terms of the stability of the composition, and quaternary ammonium salts are more preferred.

Examples of the ammonium salts include tetramethylammonium oxide, tetramethylammonium chloride, tetramethylammonium bromide, tetramethylammonium fluoride, tetrabutylammonium oxide, tetrabutylammonium chloride, tetrabutylammonium bromide, tetrabutylammonium fluoride, tetramethylammonium nitrate, tetramethylammonium acetate, tetramethylammonium propionate, tetramethylammonium maleate, and tetramethylammonium sulfate.

Preferred in particular among these ammonium salts from the viewpoint of improving electric characteristics of the silica-based film are ammonium salts such as tetramethylammonium nitrate, tetramethylammonium acetate, tetramethylammonium propionate, tetramethylammonium maleate, and tetramethylammonium sulfate.

Though not completely elucidated yet in detail, the effect due to the onium salt contained in the composition is presumed to be based on a mechanism in which the onium salt promotes the condensation reaction, so as to increase the density of siloxane bonds and reduce the number of remaining silanol groups, thereby improving the mechanical strength and dielectric property. This does not limit operations, however.

Optional Component

Preferably, the composition for forming a silica-based film in accordance with the present invention further contains a pore forming compound adapted to thermally decompose or evaporate at a heating temperature of 250° to 500° C. as an optional component (hereinafter referred to as "(d) component"). The (d) component seems to have a function of gradually forming micropores (voids or pores) in the silica-based film, thereby further thinning pores and homogenizing their forms when finally cured. For exhibiting such a function, the decrease ratio of the (d) component in a nitrogen gas atmosphere at a temperature of 250° to 500° C. is preferably at least 95 mass %, more preferably at least 97 mass %, further preferably at least 99 mass %. When the decrease ratio is less than 95 mass %, the decomposition or evaporation of the compound tends to become insufficient at the time of heating the composition for forming a silica-based film. Namely, the (d) component, a part of the (d) component, or a reaction product derived from the (d) component may remain in the finally obtained silica-based film. This may result in the deterioration of electric characteristics of the silica-based film, such as an increase in the relative permittivity.

The "decrease ratio" of the (d) component in the present invention is a value determined by the following apparatus under the following condition. Namely, the "decrease ratio" is measured by a differential scanning calorimeter (TG/DTA6300 manufactured by Seiko Instruments Inc.) under the condition where 10 mg of the above-mentioned polymer are heated at a heating rate of 10° C./min from a heating start temperature of 50° C. with a nitrogen ($N_2$) gas flow rate of 200 mL/min. α-alumina is used as a reference, whereas a ω5 open sample pan made of aluminum (manufactured by Seiko Instruments Inc.) is used as a sample container.

The standard mass of the (d) component before starting the decomposition is the mass at a temperature of 150° C. in the process of heating. This is because the decrease in mass at a temperature of 150° C. or lower is presumed to be caused by elimination of absorbed moisture or the like without substantially decomposing the (d) component itself. When the (d) component cannot directly be weighed alone because it is dissolved in a solution, etc., for example, about 2 g of the solution containing the (d) component are collected in a metal petri dish, and are dried for 3 hours at 150° C. in an air at normal pressure, and thus obtained residue is used as a sample.

Examples of the (d) component include vinyl-ether-based compounds, compounds having a polyalkylene unit such as vinyl-based compounds or polymers having a polyoxyalkylene unit such as a polyoxyethylene unit or polyoxypropylene unit, vinyl-pyridine-based compounds, styrene-based compounds, alkyl-ester-vinyl-based compounds, (meth)acrylate-based compounds, polycarbonate, polyester, and polyanhydride. As the (d) component, from the viewpoint of decomposition characteristics and film mechanical strength, polymers having a polyoxyalkylene unit are preferred, those having a polyoxypropylene unit in particular.

Examples of the polyoxyalkylene unit include polyoxyethylene, polyoxypropylene, polyoxytetramethylene, and polyoxybutylene units. More specific examples of the compounds having a polyoxyalkylene unit include ether-based compounds such as polyoxyethylene alkyl ether, polyoxyethylene sterol ether, polyoxyethylene lanolin derivatives, ethylene oxide derivatives of alkyl phenol formalin condensates, polyoxyethylene polyoxypropylene block copolymer, polyoxypropylene alkyl ether, and polyoxyethylene polyoxypropylene alkyl ether; ether-ester-based compounds such as polyoxyethylene glycerin fatty acid ester, polyoxyethylene sorbitol fatty acid ester, and polyoxyethylene fatty acid alkanolamide sulfate; ether-ester-based compounds such as polyethylene glycol fatty acid ester, ethylene glycol fatty acid ester, fatty acid monoglyceride, polyglycerin fatty acid ester, sorbitan fatty acid ester, and propylene glycol fatty acid ester; and glycol-based compounds such as ethylene glycol, diethylene glycol, triethylene glycol, propylene glycol, polyethylene glycol, and polypropylene glycol.

Examples of (meth)acrylate-based compounds include alkyl acrylate ester, alkyl methacrylate ester, alkoxyalkyl acrylate ester, and alkoxyalkyl methacrylate ester. Examples of alkyl acrylate ester include alkyl esters having a carbon number of 1 to 6 such as methyl acrylate, ethyl acrylate, n-propyl acrylate, isopropyl acrylate, n-butyl acrylate, isobutyl acrylate, pentyl acrylate, and hexyl acrylate. Examples of alkyl methacrylate include alkyl esters having a carbon number of 1 to 6 such as methyl methacrylate, ethyl methacrylate, n-propyl methacrylate, isopropyl methacrylate, n-butyl methacrylate, isobutyl methacrylate, pentyl methacrylate, and hexyl methacrylate. Examples of alkoxyalkyl acrylate ester include methoxymethyl acrylate and ethoxyethyl acrylate. Examples of alkoxyalkyl methacrylate ester include methoxymethyl methacrylate and ethoxyethyl methacrylate.

As a (meth)acrylate-based compound, copolymers with compounds having a hydroxyl group can be used. Specific examples of the compound include 2-hydroxyethyl acrylate, diethylene glycol acrylate, 2-hydroxypropyl acrylate, dipropylene glycol acrylate, methacrylic acid, 2-hydroxyethyl methacrylate, diethylene glycol methacrylate, 2-hydroxypropyl methacrylate, and dipropylene glycol methacrylate.

Examples of polyester include polycondensates of hydroxycarboxylic acid, ring-opening polymers of lactone, and polycondensates of aliphatic polyol and aliphatic polycarboxylic acid.

Examples of polycarbonate include polycondensates of carboxylic acid and alkylene glycol, such as polyethylene carbonate, polypropylene carbonate, polytrimethylene carbonate, polytetramethylene carbonate, polypentamethylene carbonate, and polyhexamethylene carbonate.

Examples of polyanhydride include polycondensates of dicarboxylic acid, such as polymalonyl oxide, polyadipoyl oxide, polypimelyl oxide, polysuberoyl oxide, polyazelayl oxide, and polysebacoyl oxide.

From the viewpoints of solubility in solvents, compatibility with siloxane resins, film mechanical characteristics, film formability, etc., Mw of the (d) component is preferably 200 to 10,000, more preferably 300 to 5,000, further preferably 400 to 2,000. When Mw exceeds 10,000, the compatibility with siloxane resins tends to decrease. When Mw is less than 200, on the other hand, the forming of pores tends to become insufficient.

Respective contents of the components in the composition for forming a silica-based film in accordance with the present invention will now be explained. The content of the (a) component in the composition for forming a silica-based film in accordance with the present invention is preferably 3 to 25 mass %. When the content of the (a) component exceeds 25 mass %, the amount of the organic solvent tends to become so small that the film forming property of the silica-based film deteriorates and the stability of the composition itself lowers. When the content of the (a) component is less than 3 mass %, on the other hand, the amount of the solvent tends to become so large that a silica-based film having a desirable thickness is hard to form.

The content of the (c) component is preferably 0.001 mass ppm to 5 mass %, more preferably 0.01 mass ppm to 1 mass %, further preferably 0.1 mass ppm to 0.5 mass %, based on the total weight of the composition for forming a silica-based film in accordance with the present invention. When the content is less than 0.001 mass ppm, electrical and mechanical characteristics of the finally obtained silica-based film tend to deteriorate. When the content exceeds 5 mass %, on the other hand, the stability, film forming property, etc. of the composition tend to deteriorate, and electric characteristics and process adaptability of the silica-based film are likely to lower. The onium salt, which is the (c) component, can be added to the composition so as to yield a desirable concentration after being dissolved in or diluted with water or a solvent when necessary.

The content of the (d) component is preferably 0.1 to 10 mass %, more preferably 1 to 5 mass %, based on the total weight of the composition for forming a silica-based film in accordance with the present invention. When the content is less than 0.1 mass %, the forming of pores tends to become insufficient. When the content exceeds 10 mass %, the film strength may decrease.

The content of the (b) component is the residue left when the total amount of the (a) component, (b) component, (c) component, (d) component, and other additives added if necessary is subtracted from the weight of the composition.

Preferably, the composition for forming a silica-based film in accordance with the present invention contains neither alkali metal nor alkaline earth metal. Even when the composition contains such a metal, the metal ion concentration in the composition is preferably 100 mass ppb or less, more preferably 20 mass ppb or less. When the metal ion concentration exceeds 100 mass ppb, metal ions are more likely to flow into semiconductor devices having a silica-based film obtained by the above-mentioned composition, whereby device performances themselves may adversely be affected. Therefore, it will be effective if alkali metals and alkaline earth metals are eliminated from within the composition by use of an ion-exchange filter or the like when necessary.

Method of Forming Silica-Based Film, Silica-Based Film, and Electronic Component Preferred embodiments of the method of forming a silica-based film, silica-based film, and electronic component in accordance with the present invention will now be explained.

Using the composition for forming a silica-based film in accordance with the present invention, the silica-based film in accordance with the present invention can be formed by spin coating, which will be explained in the following, for example. The spin coating is suitable for forming the silica-based film in accordance with the present invention, because of its excellent film formability and film homogeneity.

First, the composition for forming a silica-based film is spin-coated onto a substrate such as silicon wafer preferably at 500 to 5,000 rpm, more preferably at 1,000 to 3,000 rpm, so as to form a coating film. Here, the film homogeneity tends to deteriorate when the rotating speed is less than 500 rpm. When the rotating speed exceeds 5,000 rpm, on the other hand, the film forming property may deteriorate.

Subsequently, the organic solvent is removed from within the coating film by a hot plate or the like preferably at 50° to 350° C., more preferably 100° to 300° C. When the drying temperature at the time of removal is less than 50° C., the removal of the organic solvent tends to become insufficient. When the drying temperature exceeds 350° C., on the other hand, the (d) component for forming pores may thermally decompose before the siloxane resin sufficiently forms a siloxane skeleton, so that the amount of evaporation may increase to a disadvantageous extent, whereby the silica-based film having a desirable mechanical strength and low dielectric property may be harder to obtain.

Subsequently, the coating film having removed the organic solvent therefrom is fired at a heating temperature of 250° to 500° C., so as to be finally cured. This forms a silica-based film (Low-k film) which can exhibit a low dielectric constant even in a high frequency region of 100 kHz or more. The "relative permittivity" in the present invention refers to a value measured in an atmosphere at 23° C.±2° C. with a relative humidity of 40%±10%, and is preferably 2.5 or less. The relative permittivity can be determined by measuring the electric charge capacity between Al metal and an N-type low resistivity substrate (Si wafer), for example. The silica-based film of the present invention has a sufficient mechanical strength and can be cured at a lower temperature in a shorter time as compared with conventional ones. Preferably, the final curing is carried out in an inert atmosphere such as nitrogen, argon, and helium, for example. In this case, it will be preferred if the oxygen concentration is 1,000 ppm or less. When the heating temperature at the time of curing is less than 250° C., curing is less likely to be achieved sufficiently, and the decomposition/evaporation of the (d) component is less likely to be promoted sufficiently. When the heating temperature exceeds 500° C., on the other hand, the heat input amount may increase if there is a metal wiring layer, thereby deteriorating the wiring metal.

The heating time for curing is preferably 2 to 60 minutes, more preferably 2 to 30 minutes. When the heating time exceeds 60 minutes, the heat input amount may increase so much that the wiring metal deteriorates. Preferably used as a heating apparatus are heat processing apparatus such as silica tube furnaces and other furnaces, hot plates, and rapid thermal annealing (RTA) furnaces.

The thickness of thus formed silica-based film is preferably 0.01 to 40 μm, more preferably 0.1 to 2.0 μm. When the film thickness exceeds 40 μm, stresses are likely to generate cracks. When the film thickness is less than 0.01 μm in the case where a metal wiring layer exists between upper and lower layers of the silica-based film, leak characteristics between respective wires of the upper and lower layers tend to deteriorate.

Examples of the electronic component using thus formed silica-based film include electronic devices having a silica-based film such as semiconductor devices and multilayer wiring boards. The silica-based film in accordance with the present invention can be used, for example, as a surface protection film (passivation film), buffer coating film, or interlayer insulating film in a semiconductor device. In a multilayer wiring board, on the other hand, the film can favorably be used as an interlayer insulating film. The silica-based film in accordance with the present invention can also be used as a liquid crystal display part, an optical waveguide part, etc.

Specific examples of the semiconductor device include discrete semiconductor devices such as diodes, transistors, compound semiconductors, thermistors, varistors, and thyristors; storage devices such as DRAM (dynamic random access memory), SRAM (static random access memory), EPROM (erasable programmable read-only memory), mask ROM (mask read-only memory), EEPROM (electrical erasable programmable read-only memory), and flash memory; logic circuit devices such as microprocessors, DSP, and ASIC; integrated circuit devices such as compound semiconductors typified by MMIC (monolithic microwave integrated circuit); and photoelectric converter devices such as hybrid integrated circuit (hybrid IC), light-emitting diode, and charge-coupled device. An example of the multilayer wiring board is a high-density wiring board such as MCM.

Figure 1:
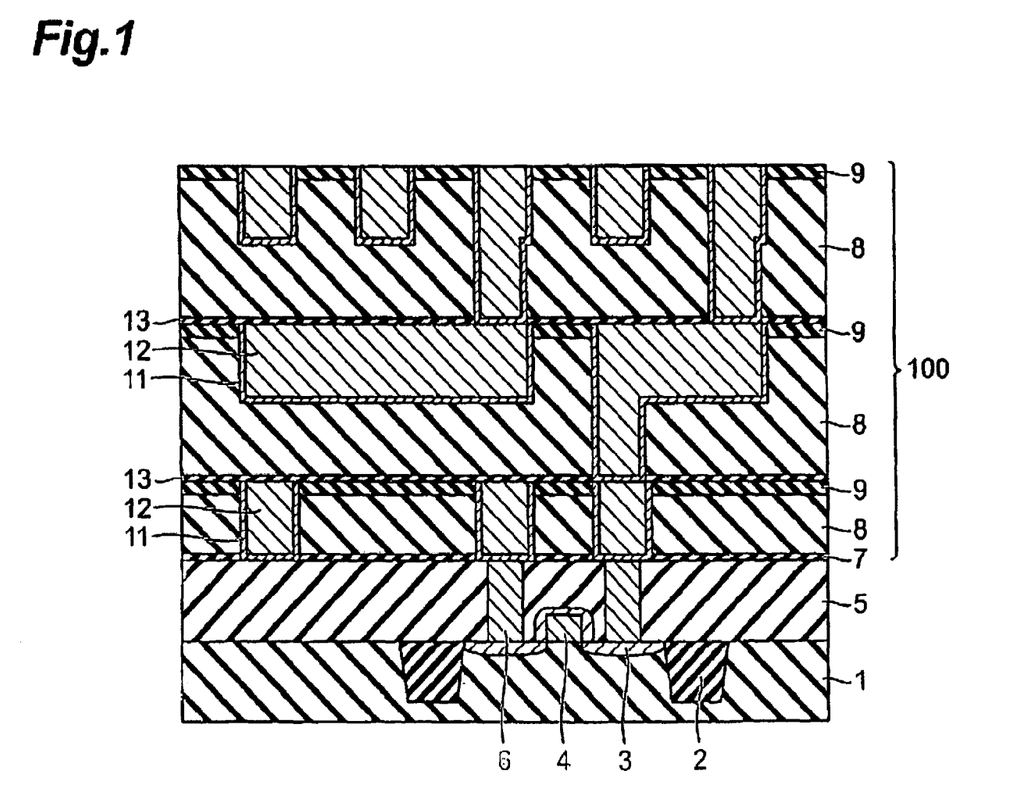
FIG. 1 is a schematic sectional view showing a preferred embodiment of a multilayer wiring structure in accordance with the present invention.

FIG. 1 is a schematic sectional view showing an embodiment of the multilayer wiring structure in accordance with the present invention. FIG. 1 shows a multilayer (three-layer) wiring structure 100 formed on a transistor, which is made, for example, as follows. First, on a transistor in which a device separating structure 2, an impurity diffusing layer 3, a gate electrode 4, a first interlayer insulating film 5, and a contact plug 6 are disposed on a silicon substrate 1, a second insulating film 7, a silica-based film 8 in accordance with the present invention, and a protective insulating film 9 are laminated in succession, so as to form a structure 200 shown in FIG. 2.

Figure 2:
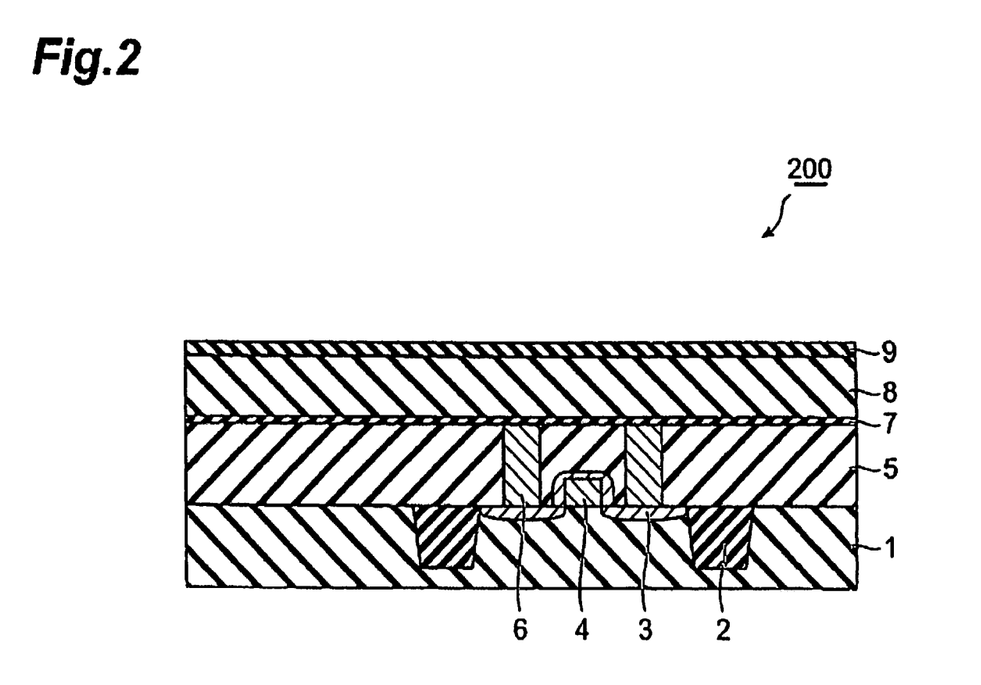
FIG. 2 is a schematic partial sectional view for explaining a wiring forming step for forming a single-layer wire on a transistor.
Figure 3:
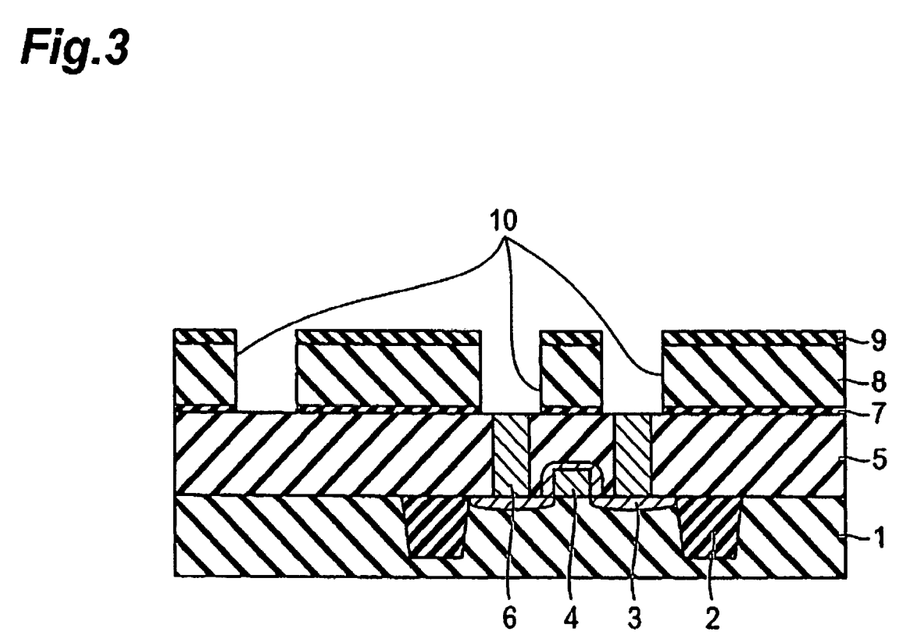
FIG. 3 is a schematic partial sectional view for explaining the wiring forming step for forming the single-layer wire on the transistor.

Subsequently, a resist film having a predetermined form, for example, is formed on the protective insulating film 9 shown in FIG. 2, and the part of protective insulating film 9 not covered with the resist film and the part of silica-based film 8 and interlayer insulating film 7 thereunder are removed by etching or the like, and then the resist film is removed, so as to form a first wiring groove 10 shown in FIG. 3.

Figure 4:
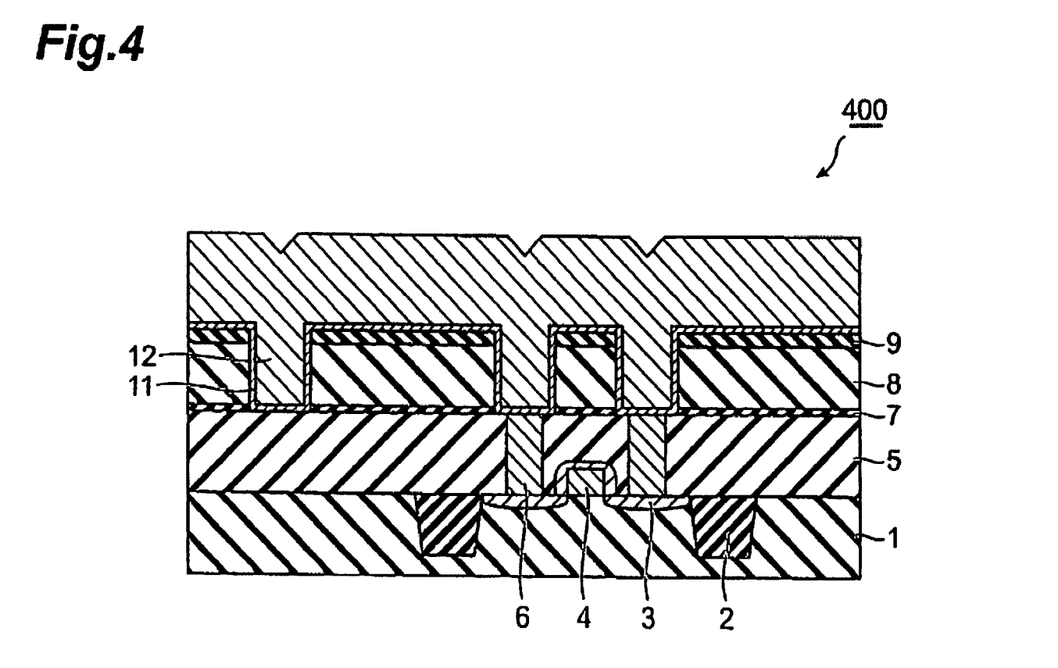
FIG. 4 is a schematic partial sectional view for explaining the wiring forming step for forming the single-layer wire on the transistor.
Figure 5:
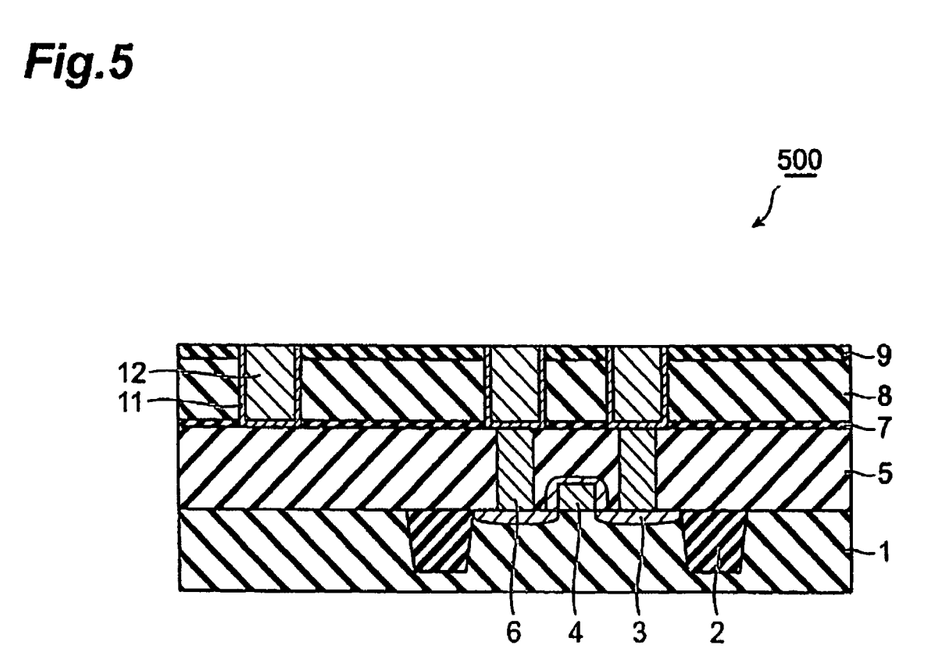
FIG. 5 is a schematic partial sectional view for explaining the wiring forming step for forming the single-layer wire on the transistor.

Subsequently, a barrier metal layer 11 is formed so as to cover the transistor and the exposed interlayer insulating film 7, silica-based film 8, and protective insulating film 9, and a copper film 12 is further laminated thereon, so as to yield a structure 400 shown in FIG. 4. Then, the copper film 12 and barrier metal layer 11 are partly removed, for example, by chemical mechanical polishing (CMP), so as to form a structure 500 shown in FIG. 5, whose surface on the side opposite from the transistor is flattened. This yields a structure in which a single layer of wiring (first layer wire) is disposed on the transistor.

Then, a barrier insulating film 13 is formed on the first layer wire, and second and third layer wires are successively laminated thereon by forming or partly removing the silica-based film 8 in accordance with the present invention, protective insulating film 9, barrier metal layer 11, and copper film 12 by the same method as that mentioned above. This yields the multilayer (three-layer) wiring structure on the transistor shown in FIG. 1. However, this does not restrict the multilayer wiring structure in accordance with the present invention.

The electronic component exemplified above or the like allows the silica-based film to have a relative permittivity sufficiently lower than that conventionally available, thereby being able to sufficiently shorten the wiring delay time in signal propagation and realize a high reliability. This can also improve the yield in production of electronic components and the like, and the process tolerance. Further, the above-mentioned excellent characteristics of the silica-based film made of the composition for forming a silica-based film in accordance with the present invention make it possible to provide electronic components and the like having a high density, a high quality, and an excellent reliability.

EXAMPLES

In the following, preferred examples of the present invention will be explained in further detail. However, the present invention is not limited to these examples.

Example 1

Making of Composition for Forming Silica-Based Film

Into a solution formed by dissolving 154.6 g of tetraethoxysilane and 120.6 g of methyltriethoxysilane in 543.3 g of cyclohexanone, 80.98 g of an aqueous solution containing 0.525 g of 70% nitric acid dissolved therein were fed dropwise for 30 minutes while being stirred. Their reaction was carried out for 5 hours after the completion of dropwise feeding, and then thus generated ethanol and cyclohexanone were partly evaporated under reduced pressure in a warm bath, whereby 583.7 g of a polysiloxane solution were obtained. The weight average molecular weight of polysiloxane determined by GPC was 1,350.

Subsequently, into 553.9 g of the polysiloxane solution, 24.86 g of polypropylene glycol (PPG-725 manufactured by Aldrich Co.), which was a pore forming compound, 498.7 g of cyclohexanone, 17.89 g of 2.38% tetramethylammonium nitrate aqueous solution (pH 3.6), and 5.5 g of 1% diluted maleic acid aqueous solution were added and dissolved while being stirred for 30 minutes at room temperature, so as to prepare a composition for forming a silica-based film in accordance with the present invention. The weight reduction ratio of polypropylene glycol (PPG-725 manufactured by Aldrich Co.) used as the pore forming compound was 99.9% at 350° C.

Example 2

Into a solution formed by dissolving 154.6 g of tetraethoxysilane and 120.6 g of methyltriethoxysilane in 543.3 g of cyclohexanone, 80.98 g of an aqueous solution containing 0.525 g of 70% nitric acid dissolved therein were fed dropwise for 30 minutes while being stirred. Their reaction was carried out for 5 hours after the completion of dropwise feeding, and then thus generated ethanol and cyclohexanone were partly evaporated under reduced pressure in a warm bath, whereby 598.2 g of a polysiloxane solution were obtained. The weight average molecular weight of polysiloxane determined by GPC was 1,280.

Subsequently, into 514.5 g of the polysiloxane solution, 22.60 g of polypropylene glycol (PPG-725 manufactured by Aldrich Co.), which was a pore forming compound, 441.6 g of diethylene glycol dimethyl ether, 16.26 g of 2.38% tetramethylammonium nitrate aqueous solution (pH 3.6), and 5.0 g of 1% diluted maleic acid aqueous solution were added and dissolved while being stirred for 30 minutes at room temperature, so as to prepare a composition for forming a silica-based film in accordance with the present invention. The weight reduction ratio of polypropylene glycol (PPG-725 manufactured by Aldrich Co.) used as the pore forming compound was 99.9% at 350° C.

Comparative Example 1

Into a solution formed by dissolving 154.6 g of tetraethoxysilane and 120.6 g of methyltriethoxysilane in 543.3 g of ethanol, 80.98 g of an aqueous solution containing 0.525 g of 70% nitric acid dissolved therein were fed dropwise for 30 minutes while being stirred. Their reaction was carried out for 5 hours after the completion of dropwise feeding, whereby 819.0 g of a polysiloxane solution were obtained. The weight average molecular weight of polysiloxane determined by GPC was 1,170.

Subsequently, into 774.0 g of the polysiloxane solution, 22.60 g of polypropylene glycol (PPG-725 manufactured by Aldrich Co.), which was a pore forming compound, 182.1 g of ethanol, 16.26 g of 2.38% tetramethylammonium nitrate aqueous solution (pH 3.6), and 5.0 g of 1% diluted maleic acid aqueous solution were added and dissolved while being stirred for 30 minutes at room temperature, so as to prepare a composition for forming a silica-based film in accordance with the present invention. The weight reduction ratio of polypropylene glycol (PPG-725 manufactured by Aldrich Co.) used as the pore forming compound was 99.9% at 350° C.

Example 3

Making of Interlayer Insulating Film

The compositions for forming a silica-based film obtained by Examples 1 and 2 and Comparative Example 1 were applied onto silicon wafers in a rotational fashion, so as to form coating films. For forming each coating film, the rotating speed was adjusted so as to form a film having a thickness of 0.50±0.05 μm after curing. Subsequently, the organic solvent in the coating films was eliminated over 3 minutes at 250° C., and then the coating films having the organic solvent removed therefrom were finally cured over 30 minutes at 400° C. by using a silica tube furnace in which $O_2$ concentration was controlled so as to become about 100 μm, whereby silica-based films to become interlayer insulating films were made. Thus obtained silica films were irradiated with He—Ne laser light with wavelength of 633 nm. The film thickness determined by an ellipsometer (Ellipsometer L116B manufactured by Gaertner Scientific Corporation) from the phase difference generated upon the light irradiation at a wavelength of 633 nm was 0.504 μm in Example 1, 0.498 μm in Example 2, and 0.501 μm in Comparative Example 1.

Subsequently, using a vapor deposition apparatus, Al metal was, deposited in vacuum on each silica-based film so as to form a circle having a diameter of 2 mm with a thickness of about 0.1 μm. As a result, interlayer insulating films having a structure in which a silica-based film is disposed between Al metal and a silicon wafer (low resistivity substrate) were made.

Measurement of Relative Permittivity

Using an apparatus in which a dielectric test fixture (HP16451B manufactured by Yokogawa Electric Corporation) was connected to an LF impedance analyzer (HP4192A manufactured by Agilent Technologies Inc.), the electric charge capacity of each of thus obtained interlayer insulating films was measured under the condition with a temperature of 23° C.±2° C., a relative humidity of 40%±10%, and a frequency in use of 1 MHz.

Then, thus measured value of electric charge capacity was put into the following expression:

<relative permittivity of interlayer insulating film>=$3.597 \times 10^{-2}$×<electric charge capacity (pF)>×<interlayer insulating film thickness (μm)> whereby the relative permittivity of the interlayer insulating film was calculated. Employed as the interlayer insulating film thickness was the value obtained by the above-mentioned measurement of the silica-based film thickness.

Measurement of Modulus of Elasticity

Using a nanoindenter SA2 (DCM manufactured by MTS Systems Corporation), the modulus of elasticity of each interlayer insulating film was measured (at a temperature of 23° C.±2° C. and a frequency of 75 Hz within an elasticity measurement range not greater than 1/10 of the interlayer insulating film thickness without fluctuating dependent on the indentation depth).

Table 1 shows results of measurement of electric characteristic and modulus of elasticity (film strength) of the interlayer insulating films obtained by Example 3.

TABLE 1

|  | Example 1 | Example 2 | Co. Exam. 3 |
|---|---|---|---|
| Relative permittivity | 2.3 | 2.3 | 2.7 |
| Modulus of elasticity (GPa) | 6.6 | 6.6 | 5.8 |

As explained in the foregoing, the present invention provides a composition for forming a silica-based film, which can exhibit a low dielectric property of 2.5 or less even in a high frequency region of 100 kHz or more and a sufficient mechanical strength while being curable at a lower temperature in a shorter time as compared with conventional ones. The present such a composition, a method of forming the same, and an electronic component provided with such a silica-based film.

What is claimed is:

1. A method of producing a composition for forming a silica-based film, the method comprising:
    a step of obtaining a solution by dissolving a compound represented by the following general formula (1) in an aprotic solvent:

$$R^1{}_n SiX_{4-n} \qquad (1)$$

wherein $R^1$ is an H or F atom, a group containing a B, N, Al, P, Si, Ge, or Ti atom, or an organic group having a carbon number of 1 to 20; X is a hydrolyzable group; and n is an integer of 0 to 2; $R^1$ being either identical or different when n is 2; X being either identical or different when n is 0 to 2;
    a step of obtaining a polysiloxane solution by hydrolyzing and condensing the compound after adding an inorganic acid catalyst to the solution;
    a step of removing a solvent in the polysiloxane solution so that the final composition for forming a silica-based film contains said aprotic solvent in an amount of at least 90% by mass to the total amount of the solvent, and
    a step of combining an onium salt with the polysiloxane solution after the removing step, wherein the content of the onium salt is 0.001 mass ppm to 0.5 mass % based on the total weight of the composition for forming a silica-based film.

2. The method according to claim 1, further comprising a step of mixing a pore forming compound.

3. The method according to claim 2, wherein the pore forming compound thermally decomposes or evaporates at a heating temperature of 250° to 500° C.

4. The method according to claim 1, wherein the aprotic solvent contains at least one species of aprotic solvent selected from the group consisting of ether-based solvents and ketone-based solvents.

5. The method according to claim 1, wherein the onium salt contains at least an ammonium salt selected from the group consisting of tetramethylammonium nitrate, tetramethylammonium acetate, tetramethylammonium propionate, tetramethylammonium maleate, and tetramethylammonium sulfate.

6. The method according to claim 1, wherein the polysiloxane contains a siloxane resin including units derived from tetraalkoxysilane and trialkoxysilane.

7. The method according to claim 1, wherein the aprotic solvent contains at least one species of aprotic solvent selected from the group consisting of alkylene glycol dialkyls, alkylene glycol alkyl esters, alkylene glycol diesters, and cyclic ketones.

8. The method according to claim 1, wherein the aprotic solvent contains an aprotic solvent having a relative permittivity of at least 10.

9. The method according to claim 1,
    wherein the total content M of H, F, B, N, Al, P, Ge, Ti, and C atoms as calculated by formula (2) in the polysiloxane with respect to 1 mol of Si atom is 0.65 mol or less, formula (2):

$$M=[M_1+(M_2/2)+(M_3/3)]/M_{Si}$$

wherein $M_1$ is the total number of specific binding atoms which are respectively bonded with a single (sole) Si atom; $M_2$ is the total number of specific binding atoms which are respectively bonded to two silicon atoms; $M_3$ is the total number of specific binding atoms which are respectively bonded to three silicon atoms; and $M_{Si}$ is the total number of Si atoms.

10. The method according to claim 9, wherein M is a value in the range from about 0.20 to less than 0.45.

11. The method according to claim 1, wherein the aprotic solvent includes a dialkylether of dihydric alcohol.

\* \* \* \* \*